United States Patent
Doser et al.

(10) Patent No.: US 9,083,922 B2
(45) Date of Patent: Jul. 14, 2015

(54) COLOR METADATA FOR A DOWNLINK DATA CHANNEL

(75) Inventors: Ingo Tobias Doser, Donaueschingen (DE); Jurgen Stauder, Montreuil/Ille (FR); Laurent Blonde, Thorigne-Fouillard (FR); Julien Thollot, Betton (FR); David J. Bancroft, Reading (GB); Wolfgang Endress, Villingen-Schwenningen (DE)

(73) Assignee: Thomson Licensing, Boulogne-Billancourt (FR)

( * ) Notice: Subject to any disclaimer, the term of this patent is extended or adjusted under 35 U.S.C. 154(b) by 785 days.

(21) Appl. No.: 12/224,538

(22) PCT Filed: Mar. 15, 2007

(86) PCT No.: PCT/US2007/006546
§ 371 (c)(1),
(2), (4) Date: Aug. 28, 2008

(87) PCT Pub. No.: WO2007/111843
PCT Pub. Date: Oct. 4, 2007

(65) Prior Publication Data
US 2009/0102968 A1    Apr. 23, 2009

(30) Foreign Application Priority Data

Mar. 23, 2006 (EP) .................................. 06300281

(51) Int. Cl.
*G09G 5/02* (2006.01)
*H04N 1/60* (2006.01)
(Continued)

(52) U.S. Cl.
CPC ............ *H04N 1/6058* (2013.01); *G06T 11/001* (2013.01); *H04N 9/641* (2013.01); *H04N 2201/3225* (2013.01); *H04N 2201/3256* (2013.01)

(58) Field of Classification Search
CPC ................................. H04N 1/00; H04N 13/00
USPC ........... 345/589, 590, 604; 382/162; 358/518, 358/523, 525
See application file for complete search history.

(56) References Cited

U.S. PATENT DOCUMENTS 5,832,109 A    11/1998  Mahy
7,184,057 B2   2/2007   Stokes et al.
(Continued)

FOREIGN PATENT DOCUMENTS

EP    0763927 A1    3/1997
JP    200432700     1/2004
(Continued)

OTHER PUBLICATIONS

IEC 61966-2-4, "Multimedia systems and equipment—Colour measurement and management—Part 2-4 Colour management—Extended-gamut YCC colour space for video application—xvYCC", International Electrotechnical Commission, Jan. 2006, ISBN 2-8318-8426-8.*

(Continued)

*Primary Examiner* — Ke Xiao
*Assistant Examiner* — Weiming He
(74) *Attorney, Agent, or Firm* — Robert D. Shedd; Paul P. Kiel

(57) ABSTRACT

The present invention provides a method and system for determining and providing color metadata for a downlink data channel. In accordance with the present invention color metadata is determined such that gamut mapping is defined by a transmitted source gamut which enables adapted mapping that preserves saturation and contrast levels of the source for a downlink data channel. The metadata is then provided to a downlink data channel for color management.

19 Claims, 2 Drawing Sheets

(51) Int. Cl.
*G06T 11/00* (2006.01)
*H04N 9/64* (2006.01)

(56) References Cited

U.S. PATENT DOCUMENTS

| | | | |
|---|---|---|---|
| 2005/0073730 A1* | 4/2005 | Huang et al. | 358/518 |
| 2005/0141008 A1 | 6/2005 | Billow et al. | |
| 2005/0152597 A1 | 7/2005 | Spaulding et al. | |
| 2005/0152612 A1* | 7/2005 | Spaulding et al. | 382/254 |
| 2006/0018536 A1 | 1/2006 | Haikin et al. | |
| 2006/0244983 A1* | 11/2006 | Zeng | 358/1.9 |
| 2007/0046958 A1* | 3/2007 | Hoof et al. | 358/1.9 |
| 2007/0121132 A1* | 5/2007 | Blinn et al. | 358/1.9 |
| 2007/0211074 A1 | 9/2007 | Yeung | |
| 2007/0291179 A1 | 12/2007 | Sterling et al. | |
| 2009/0109344 A1 | 4/2009 | Ollivier et al. | |
| 2009/0284554 A1 | 11/2009 | Doser | |

FOREIGN PATENT DOCUMENTS

| | | |
|---|---|---|
| JP | 200512285 | 1/2005 |
| JP | 2005318491 | 11/2005 |
| KR | 100800736 | 1/2008 |
| WO | 2006050305 A1 | 5/2006 |

OTHER PUBLICATIONS

, Hitachi, LTD. et al., "High-Definition Multimedia Interface, Specification Version 1.3," Jun. 22, 2006, XP002391813.

Morovic J. and Luo M. R. "The Fundamentals of Gamut Mapping: A Survey", draft submitted to the Journal of Imaging Science and Technology, 45/3:283-290, 2001.

International Search Report, dated Sep. 11, 2007.

Office Action for U.S. Appl. No. 10/593,195 mailed Oct. 20, 2009, Jan. 28, 2010, Jul. 9, 2010, Notice of Allowance Dec. 1, 2010, Notice of Abandonment Mar. 17, 2011.

Office Actions for U.S. Appl. No. 12/083,026 mailed Jun. 2, 2011, Oct. 31, 2011.

Office Actions for U.S. Appl. No. 12/086,707 mailed Apr. 28, 2011, Nov. 22, 2011.

Office Actions for U.S. Appl. No. 11/665,809 mailed Dec. 7, 2009, Feb. 26, 2010, Nov. 8, 2010, Mar. 15, 2011, Notice of Allowance Apr. 20, 2011, Aug. 4, 2011, Office Action Oct. 5, 2011, Nov. 7, 2011, Notice of Allowance Nov. 18, 2011, Jun. 4, 2012.

* cited by examiner

COLOR METADATA FOR A DOWNLINK
DATA CHANNEL

This application claims the benefit, under 35 U.S.C. §365 of International Application PCT/US2006/006546 filed Mar. 15, 2007 which was published in accordance with PCT Article 21(2) on Oct. 4, 2007 in English and which claims the benefit of European patent application No. 06300281.0 filed Mar. 23, 2006.

FIELD OF THE INVENTION

The present invention generally relates to color management and, more particularly, to determining and providing color metadata for a downlink data channel for enabling improved gamut mapping and color management.

BACKGROUND OF THE INVENTION

In color management color spaces are discriminated as device dependent (DD) and device independent (DI) color spaces. Device dependent color spaces are generally the RGB and xvYCC color spaces (proposed by Sony™ in 2005 for HDMI 1.3). Device dependent color signals result in a reproduced color that depends on the display device. Device independent color spaces are typically CIE XYZ and CIE L*a*b*. Device independent color signals correspond directly to the reproduced color. The link between DD and DI color signals for a given display device or for a given pictorial content is defined by a profile.

When connecting a HDMI source to a HDMI sink, source and sink are described by profiles. One part of a profile is the color gamut. The color gamut describes all colors that are reproducible by a given HDMI sink display or that are present in a given content. The color gamut can be described by a Gamut Boundary Description (GBD). When a given image content has a gamut larger or different from the gamut of the HDMI sink, the colors lying outside the aimed gamut have to be clipped or moved accordingly. This procedure is called Gamut Mapping (GM). The gamut of the content is circumscribed by the gamut of the HDMI source.

SUMMARY OF THE INVENTION

The present invention advantageously provides a method and system for determining and providing color metadata for a downlink data channel. In accordance with the present invention color metadata is determined such that gamut mapping is defined by a transmitted source gamut which enables adapted mapping that preserves saturation and contrast levels of the source for a downlink data channel. The metadata is then provided to a downlink data channel for color management.

In one embodiment of the present invention, a method for determining color metadata for a downlink data channel for preserving a color gamut of content of a source includes defining a color space gamut using the color gamut of said source, and performing gamut mapping using the defined color space gamut.

In an alternate embodiment of the present invention the method includes defining the color space gamut in xvYCC space.

In various embodiments of the present invention, a color space definition comprises a gamut boundary description and an indexed facet set is implemented to define the color space gamut. Alternatively, a regular sampling scheme can be used to define the color space gamut.

BRIEF DESCRIPTION OF THE DRAWINGS

The teachings of the present invention can be readily understood by considering the following detailed description in conjunction with the accompanying drawings, in which.

Figure 1:
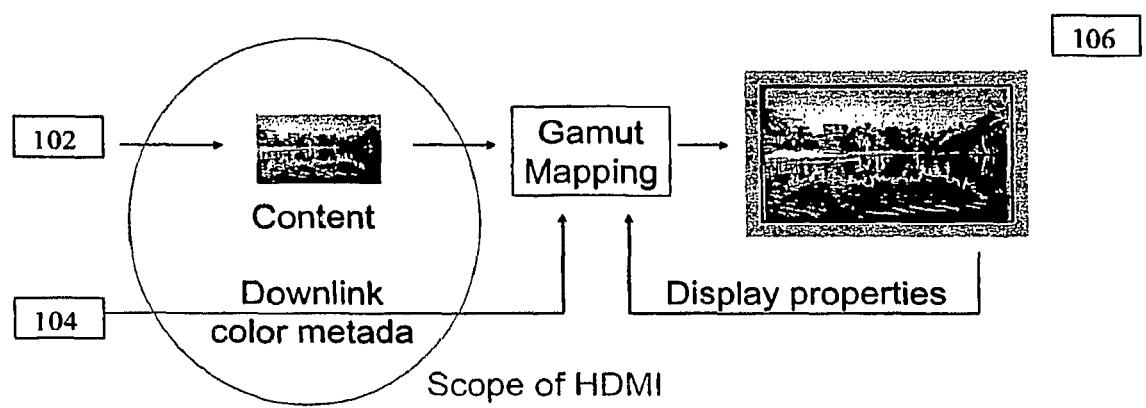
FIG. 1 depicts a high level block diagram of a gamut mapping system in which an embodiment of the present invention can be applied.

It should be understood that the drawings are for purposes of illustrating the concepts of the invention and are not necessarily the only possible configuration for illustrating the invention. To facilitate understanding, identical reference numerals have been used, where possible, to designate identical elements that are common to the figures.

DETAILED DESCRIPTION OF THE INVENTION

The present invention advantageously provides a method and system for determining and providing color metadata for a downlink data channel. Although the present invention will be described primarily within the context of a HDMI TMDS downlink data channel, the specific embodiments of the present invention should not be treated as limiting the scope of the invention. It will be appreciated by those skilled in the art and informed by the teachings of the present invention that the concepts of the present invention can be advantageously applied for providing color metadata for substantially any downlink data channel for enabling greater gamut mapping.

Furthermore, although the present invention will be described primarily within the context of specific colorimetries and color space indicators, the specific embodiments of the present invention should not be treated as limiting the scope of the invention. It will be appreciated by those skilled in the art and informed by the teachings of the present invention that the concepts of the present invention can be advantageously applied using substantially any colorimetries and color space indicators, whether known or unknown.

This present invention is described primarily within the context of color metadata for an HDMI TMDS downlink data channel, however, the color management principle will not be thoroughly discussed or defined herein, since the colorimetry of a content signal is already defined by the color space used.

A motivation for the color metadata of the present invention is that in using current gamut mapping methods, colors are out of gamut of the HDMI sink that need to be gamut mapped. However, the downlink metadata can not cover the natural properties of the HDMI sink. In addition, the color metadata of the present invention can not cover the gamut mapping process since gamut mapping depends on the properties of the HDMI sink. Instead, the downlink color metadata of the present invention addresses the properties of the HDMI source.

FIG. 1 depicts a high level block diagram of a gamut mapping system 100 in which an embodiment of the present invention can be applied. More specifically, as depicted in FIG. 1, original media content 102 is communicated downstream with color metadata 104 in accordance with the present invention. The media content 102, the color metadata 104 and properties of the display 106 are all used for gamut mapping. In the present invention, gamut mapping and display properties are not addressed. That is gamut mapping is a well-known topic in the art as evidenced by the scientific literature Morovic J. and Luo M. R., The Fundamentals of Gamut Mapping: A Survey, Journal of Imaging Science and Technology, 45/3:283-290, 2001.

As previously stated, the sink profile is already known by the color space used and needs not be included in the metadata of the present invention. However, the gamut defined by the color space can be very large, specifically in case of wide gamut color spaces. When the gamut of the color space in use is much larger than the gamut of the image content, gamut mapping may be less efficient.

Figure 2:
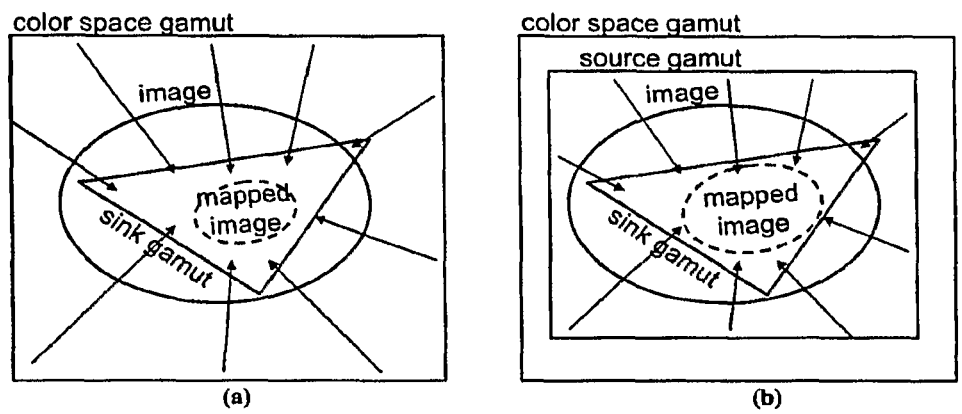
FIG. 2(a) depicts a prior art example of gamut mapping in which an entire color space gamut (the large rectangle) is able to be mapped onto the gamut of an HDMI sink gamut (the triangle)
FIG. 2(b) depicts a proposed gamut mapping approach in accordance with an embodiment of the present invention.

FIG. 2(a) depicts a prior art example of gamut mapping in which an entire color space gamut (the large rectangle) is able to be mapped onto the gamut of an HDMI sink gamut (the triangle). Such mapping compresses image content with a gamut (the ellipse) smaller than the color space gamut onto an image having a gamut (the dotted ellipse) smaller than the gamut of the HDMI sink. However, when using such gamut mapping, the image loses saturation and contrast and the capacities of the sink are not exploited.

FIG. 2(b) depicts a proposed gamut mapping approach in accordance with an embodiment of the present invention in which the description of the gamut of the HDMI sink (the "source gamut" rectangle) is used to accomplish the gamut mapping. In the gamut mapping of FIG. 2(b), the mapping is less strong and the gamut of the media content is better preserved. That is, gamut mapping defined by transmitted HDMI source gamut in accordance with the present invention enables adapted mapping that preserves saturation and contrast and exploits the capacities of the sink.

In one embodiment of the present invention, the requirements for the sink gamut boundary description for the color metadata of the present invention include 1) High precision; 2) Concise representation and 3) High processing speed and low processing complexity.

For example, the first requirement is high precision. This requirement depends on how a source gamut boundary description (GBD) is calculated (out of scope of HDMI) and on color space precision (within scope of HDMI). For a source GBD calculation, two cases can be distinguished as follows:
  1. Source GBD is voluntarily larger than source gamut→color reproduction will be slightly deteriorated, but GBD precision is less important.
  2. Source GBD is close to source gamut→best color reproduction, but GBD precision needs to be maximal.

Because the calculation of the sink GBD is not in the scope of HDMI, GBD precision should be high. The precision of GBD needs to be related to the precision of the color space of the signal. Since gamut mapping is applied to the signal, GBD precision can always be less or equal than color space precision. GBD precision can be modulated by the choice of a color space independent from signal color space.

The second requirement for the sink gamut boundary description for the color metadata of the present invention is concise representation which is inversely correlated to the first requirement. That is, concise representation is in general a data compression problem. A concise GBD depends on the shape of a source gamut which is out of scope of HDMI. Parametric representations cannot be used when sources with an unknown number of primaries, with unknown tone reproduction and of unknown type (additive, subtractive) are included in the samples. Gamuts may not even be convex. If the shape of the source gamut is not known, a source adapted representation cannot be used. Instead, general assumptions such as smoothness and regularity can be applied. When the source gamut is smooth, a sampling scheme is efficient. When the source gamut is regular, then regular sampling can be used.

The third requirement for the sink gamut boundary description for the color metadata of the present invention is high speed and low complexity of GBD processing in the HDMI sink. When using a sampling scheme for a source GBD, the easiest processing would be on samples that are in a sense regular. If the second requirement demands a more concise representation based on irregular sampling, the sampling order or the samples structure can be added to the samples in order to speed up processing. In accordance with one embodiment of the present invention, a possible representation is an indexed facet set, since today's hardware supports geometrical operations such as line to surface intersections.

The inventors depict herein a generic example of the concepts for providing metadata for a downlink data channel in accordance with the present invention followed by more specific examples.

That is in the various embodiments of the present invention described below, the color downlink metadata uses one of the following colorimetries:
  ITU-R BT.601;
  ITU-R BT.709;
  CIE XYZ.
Furthermore, the color downlink metadata of the present invention describes the HDMI source gamut using one of the four color spaces indicated by a color space indicator:
  ITU-R BT.709;
  IEC 61966-2-4-SD
  IEC 61966-2-4-HD
  DCI specification V5.1.

Table 1 below depicts a generic example of a configuration table for defining the color space of the color downlink metadata of the present invention:

TABLE 1

| Name of field | Symbol | Size | Description |
| --- | --- | --- | --- |
| GBD_COLOR_SPACE | | 3 bit | Color space of GBD |

The gamut boundary description (GBD), in accordance with the present invention, can therefore be either Device dependent (ITU-R BT.709-4, IEC 61966-2-4) or Device independent (DCI).

The color encoding (color space precision) of the present invention is defined according to the chosen color space. As such in the embodiment of the present invention described below, to be harmonized with other parts of HDMI 1.3, color precision can be defined as:
  3×8 bit
  3×10 bit
  3×12 bit Table 2 below depicts generic example of a configuration table for defining the color precision of the color downlink metadata of the present invention:

TABLE 2

| Name of field | Symbol | Size | Description |
| --- | --- | --- | --- |
| GBD_COLOR_PRECISION | N | 2 bit | Color precision: 8 bit, 10 bit, 12 bit |

In one embodiment of the present invention, the HDMI source gamut is described by a set of vertices with or without indexed facets in the chosen color space as depicted in Table 3, which follows:

TABLE 3

| Name of field | Symbol | Size | Description |
|---|---|---|---|
| NUMBER_VERTICES | $N_V$ | 16 bit | Number of vertices |
| GAMUT_VERTICES | | typically <18.5 KB | Packed vertices |
| FACET_MODE | | 1 bit | Switch for indexed vertices yes/no |
| NUMBER_FACETS | $N_F$ | 16 bit | Number of facets |
| GAMUT_FACETS | | typically <18.5 KB | Packed facet indices |

The size of the GAMUT_VERTICES and GAMUT_FACETS fields of the GBD metadata can be characterized according to equation one (1), which follows:

$$S = 3N_V N + 3N_F \lceil ld(N_V) \rceil \quad (1)$$

In equation (1) above, ⌈*⌉ depicts an operation that rounds to the next upper integer. Furthermore, in equation (1) "ld" depicts the logarithm to the base of 2. In order to limit the size of the metadata block, the constraint $S \leq S_{max}$ applies to the choice of $N_V$ and $N_F$ while $S_{max}$ depends on the transport mechanism. In a typical application of the present invention, a plausible value for $S_{max}$ is 40 KB.

In addition, in various embodiments of the color downlink metadata of the present invention, fields are included to indicate at least a "Start of metadata package" and "Validity period (e.g., time stamps, frame references, etc)" for purposes of synchronization.

As previously stated, the inventors provide below a specific example of a color downlink metadata in accordance with an embodiment of the present invention for a three primary media content. In the example below, the gamut is described in xvYCC space (proposed by Sony™ in 2005 for HDMI 1.3) at 8 bit color encoding. The GBD depicted in Table 4 below consists of black point, white point, as well as of red, green and blue primaries. The total size of the metadata block is 144 bit as follows:

TABLE 4

| Name of field | Symbol | Size | Contents |
|---|---|---|---|
| GBD_COLOR_SPACE | | 3 bit | xvYCC space |
| GBD_COLOR_PRECISION | N | 2 bit | 3 × 8 bit |
| NUMBER_VERTICES | $N_V$ | 16 bit | 5 |
| GAMUT_VERTICES | | 120 bit | Packed vertices |
| FACET_MODE | | 1 bit | Indexed vertices: no |
| Total size | | 144 bit | |

A second example is presented below for a GBD at visibility threshold. The GBD is constructed in CIE L*a*b*. It is assumed that the gamut boundary is smooth with a maximal slope in L*a*b* space of 4%. Further assuming a visibility threshold characterized according to equation two (2), which follows:

$$\Delta E = \sqrt{(\Delta L)^2 + (\Delta a)^2 + (\Delta b)^2} = 1 \quad (2)$$

Using the conditions described above, it is concluded that the distance between samples representing the boundary need to be less than ΔE=25. The GBD is set to a cuboid with the limits [0, 116], [−200,200], [−500,500] for L*, a*, b*, respectively. In order to cover the surface of the cuboid by samples having a distance of ΔE=25, $N_F$=3080 triangles are required and $N_V$=1540 vertices are required. Selecting XYZ space at 10 bit, each vertex requires 30 bit. Each facet requires an additional 36 bit. With $N_V$=1540, vertices can be indexed using 12 bit. As such, the total size of this metadata packet is 19.1 KB as depicted in Table 5, which follows:

TABLE 5

| Name of field | Symbol | Size | Contents |
|---|---|---|---|
| GBD_COLOR_SPACE | | 3 bit | CIE XYZ space |
| GBD_COLOR_PRECISION | N | 2 bit | 3 × 10 bit |
| NUMBER_VERTICES | $N_V$ | 16 bit | 2812 |
| GAMUT_VERTICES | | 5.6 kB | Packed vertices |
| FACET_MODE | | 1 bit | Indexed vertices: yes |
| NUMBER_FACETS | $N_F$ | 16 bit | 5624 |
| GAMUT_FACETS | | 13.5 kB | Packed facet indices |
| Total size | | 19.1 kB | |

The metadata can be provided to a downlink data channel on a separate stream or alternatively as part of the original media content. In alternate embodiments of the present invention, the determined metadata of the present invention can be provided for use by a downlink data channel or device on a storage medium such as an optical disk (e.g., DVD) as part of original content or as a separate stream or signal.

Having described preferred embodiments for a method and system for determining and providing color metadata for a downlink data channel (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. While the forgoing is directed to various embodiments of the present invention, other and further embodiments of the invention may be devised without departing from the basic scope thereof. As such, the appropriate scope of the invention is to be determined according to the claims, which follow.

The invention claimed is:

1. A method for gamut mapping a color gamut of content of a source, comprising:
    determining metadata describing said color gamut of content of a source;
    communicating said metadata to a data channel for use in said gamut mapping that preserves saturation and contrast levels of said source; and
    performing said gamut mapping based on a color space gamut defined using said color gamut of said source;
    wherein the color gamut of said source is defined by a set of vertices with indexed facets in a chosen color space;
    wherein a size, measured in bits, of gamut vertices and gamut facets fields of the color space gamut definition is characterized according to an equation, which follows:

$$S = 3N_V N + 3N_F \lceil ld(N_V) \rceil,$$

wherein, ⌈*⌉ depicts an operation that rounds to the next upper integer, ld depicts a logarithm to the base of 2, N represents color precision of the chosen color space, $N_v$ represents a number of vertices, and $N_F$ represents a number of facets.

2. The method of claim 1, wherein said color space gamut is defined in xvYCC space.

3. The method of claim 1, wherein said content comprises a three color primary.

4. The method of claim 1, wherein the color gamut of said source is smooth and a sampling scheme is implemented to define the color space gamut.

5. The method of claim 1, wherein the color gamut of said source is regular and a regular sampling scheme is implemented to define the color space gamut.

6. The method of claim 1, wherein an indexed facet set is implemented to define the color space gamut.

7. The method of claim 1, wherein said color space gamut definition comprises a gamut boundary description.

8. The method of claim 7 wherein said gamut boundary description comprises a cuboid.

9. The method of claim 1, wherein a precision of said chosen color space is defined by at least one of 3×8 bit, 3×10 bit, and 3×12 bit.

10. The method of claim 1, wherein said color space gamut is defined in CIE L*a*b* space.

11. The method of claim 1, wherein $3N_vN$ corresponds to the size for gamut vertices, and $3N_F\lceil ld(N_v)\rceil$ corresponds to the size for gamut facets.

12. A method, at a downlink data channel, for performing gamut mapping of a content of a source, comprising:
  receiving metadata describing the color gamut of content of the source;
  using said received metadata for an adaptation of said gamut mapping that preserves saturation and contrast levels of the source; and
  performing said gamut mapping;
  wherein said adaptation comprises defining a color space gamut using the color gamut of said source; and using said defined color space gamut in said gamut mapping;
  wherein the color gamut of said source is defined by a set of vertices with indexed facets in a chosen color space; and a size, measured in bits, of gamut vertices and gamut facets fields of the color space gamut definition is characterized according to an equation, which follows:

$$S=3N_VN+3N_F\lceil ld(N_V)\rceil.$$

wherein, $\lceil * \rceil$ depicts an operation that rounds to the next upper integer, ld depicts a logarithm to the base of 2, N represents color precision of the chosen color space, $N_v$ represents number of vertices, and $N_F$ represents number of facets.

13. The method of claim 12, wherein said color space gamut definition comprises a gamut boundary description.

14. The method of claim 13, wherein said gamut boundary description comprises a cuboid.

15. The method of claim 12, wherein a precision of said chosen color space is defined by at least one of 3×8 bit, 3×10 bit, and 3×12 bit.

16. The method of claim 12, wherein $3N_vN$ corresponds to the size for gamut vertices, and $3N_F\lceil ld(N_v)\rceil$ corresponds to the size for gamut facets.

17. A method for gamut mapping a color gamut of content of a source, comprising:
  determining metadata describing a color gamut boundary of content of a source;
  communicating the metadata to a sink, via a data channel, for use in the gamut mapping; and
  performing the gamut mapping based on the metadata for display of the content at the sink, wherein the color gamut is described using a set of vertices with facets in a chosen color space, and further wherein the metadata describing the color gamut boundary of the source comprises a set of data including:
  color space indicator that is indicative of the color space associated with the gamut boundary description;
  number of vertices indicator indicative of number of vertices associated with the gamut boundary description;
  gamut vertices data associated with the gamut boundary description;
  facet mode indicator that is indicative of whether facet data is included in the gamut boundary description;
  number of facets indicator indicative of number of facets associated with the gamut boundary description; and
  gamut facet data associated with the gamut boundary description, and in accordance with the facet mode indicator.

18. The method for gamut mapping according to claim 17, wherein the set of data further includes a color precision indicator that is indicative of a color space precision associated with the gamut boundary description.

19. The method for gamut mapping according to claim 18, wherein the color precision indicator indicates that the color space precision is one of 8 bit, 10, and 12 bit precision.

* * * * *